United States Patent [19]

Schmitz et al.

[11] Patent Number: 4,932,136
[45] Date of Patent: Jun. 12, 1990

[54] TESTER FOR COORDINATE MEASURING DEVICES

[75] Inventors: Bernd-Horst Schmitz, Stolberg; Joachim Jesch, Düren; Horst Corr, Übach-Palenberg; Rudolf Hackenberg, Langerwehe-Jüngersdorf, all of Fed. Rep. of Germany

[73] Assignee: Uranit GmbH, Jülich, Fed. Rep. of Germany

[21] Appl. No.: 379,624

[22] Filed: Jul. 13, 1989

[30] Foreign Application Priority Data

Jul. 13, 1988 [DE] Fed. Rep. of Germany ....... 3823684

[51] Int. Cl.$^5$ ............................................. G01C 25/00
[52] U.S. Cl. ......................................... 33/502; 33/567; 73/1 J
[58] Field of Search ........................ 33/502, 503, 567; 73/1 E, 1 J, 1 R

[56] References Cited

U.S. PATENT DOCUMENTS

| | | | |
|---|---|---|---|
| 3,426,436 | 2/1969 | Perwas | 33/567 |
| 3,775,858 | 12/1973 | Meyer | 33/567 |
| 4,155,243 | 5/1979 | Elsner | 73/1 R |
| 4,364,182 | 12/1982 | Jones | 33/567 |
| 4,373,267 | 2/1983 | Lycan | 33/502 |
| 4,492,036 | 1/1985 | Beckwith, Jr. | 33/503 |
| 4,523,450 | 6/1985 | Herzog | 33/502 |
| 4,763,507 | 8/1988 | Zofchak | 73/1 J |

OTHER PUBLICATIONS

Weckenmann, "Kenngrössen für die Angabe der Genauigkeit von Koordinatenmessgeräten" (Characteristic Parameters for Describing the Accurancy of Coordinate Measuring Machines), Technisches Messen 50, 1983, vol. 5, pp. 179-184.

Neumann, "Genauigkeitsangaben zu Drehtischen und Besonderheiten ihrer Anwendung auf Koordinaten-Messgeräten", VDI-Berichte 529, VDI-Verlag GmbH 1984, pp. 1-19.

Primary Examiner—Thomas B. Will
Attorney, Agent, or Firm—Spencer & Frank

[57] ABSTRACT

A tester for use in testing coordinate measuring devices includes a hub having a generally tubular body portion, an outer ring, and a plurality of spokes connected to the hub and to the outer ring, each of the spokes having a generally tubular body portion and extending radially from the hub. A plurality of holders are connected to respective ones of the plurality of spokes, and elements respectively supported by the holders are provided which are adapted for use in testing the coordinates of a measuring device. The generally tubular body portion of the hub and the generally tubular body portion of each of the spokes is composed of a bonded fiber material in which layers of circumferential windings alternate with layers of helical windings, and wherein the helical windings are wound of a fiber which has a negative coefficient of thermal expansion. The holders and the elements respectively supported by the holders are composed of a relatively hard material which has a small positive coefficient of thermal expansion.

11 Claims, 2 Drawing Sheets

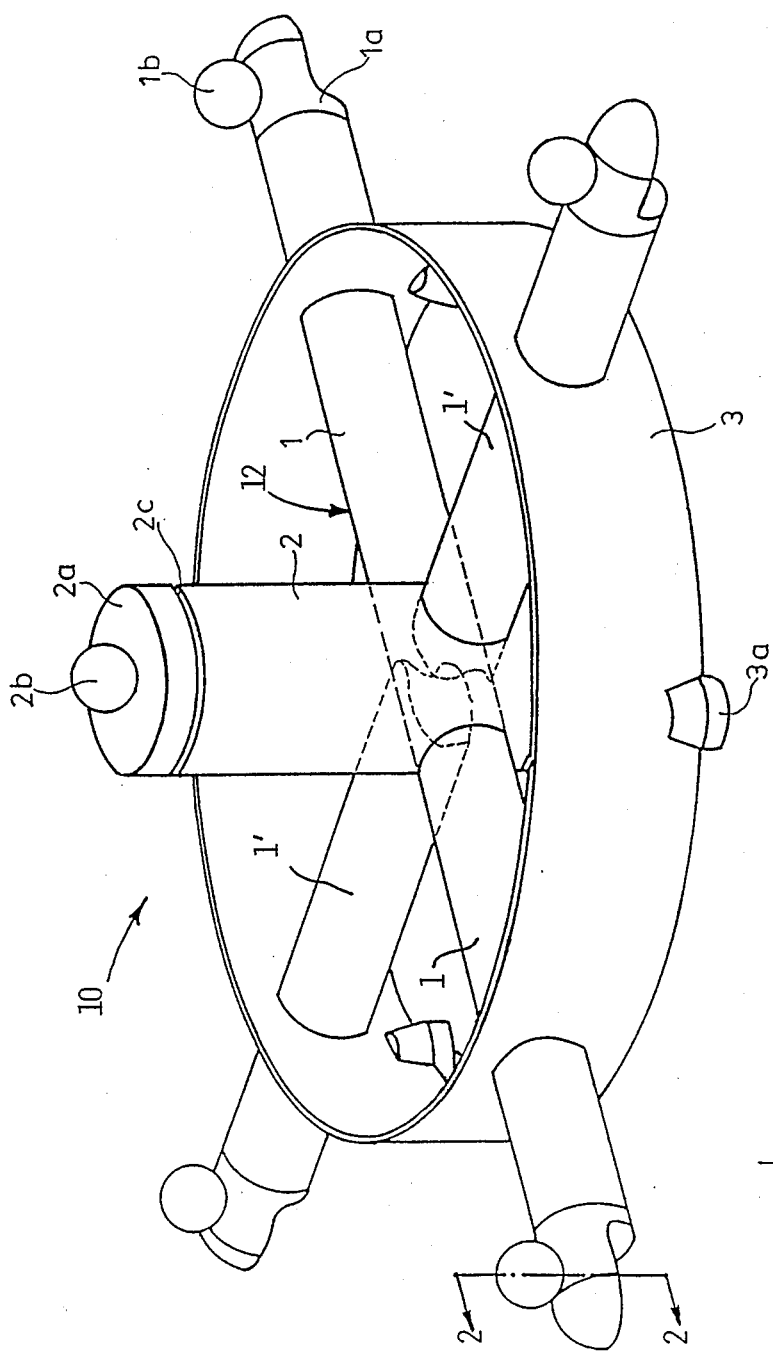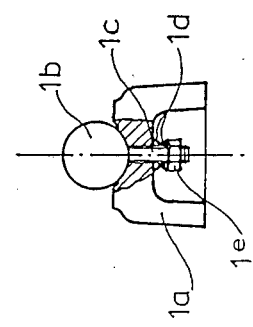

TESTER FOR COORDINATE MEASURING DEVICES

CROSS-REFERENCE TO RELATED APPLICATION

The present disclosure relates to the subject matter disclosed in German Application No. P 38 23 684.2 of July 13th, 1988, the entire specification of which incorporated herein by reference.

BACKGROUND OF THE INVENTION

The present invention relates to a tester for use in testing coordinate measuring devices, the tester including a body element carrying a plurality of form-lockingly held balls for testing the X, Y and Z coordinates of the measuring device.

The accuracy of coordinate measuring devices can be determined and monitored by means of testers (see Technisches Messen [Technological Measuring], Volume 50, 1983, No. 5, pages 179-184) which permit the determination and examination of characteristic parameters.

A tester of this type is illustrated and described in paragraph 5 of VDI Berichte {VDI [Association of German Engineers] Reports] 529, published by VDI-Verlay GmbH, Düsseldorf, 1984, page 15. This tester is composed of a solid, plate-shaped body element equipped with a total of five balls which are connected to the plate-shaped body element in a form-locking manner. Four of these balls lie in one plane, and one ball is arranged 300 mm above that plane. The balls are arranged in a pattern at the corners of a square, and are disposed such that a base length exists between the balls at adjacent corners which is 600 mm. If such a tester is employed, the influence of the environmental conditions on the measuring results must be considered. A particularly critical influential parameter is considered to be the temperature, since temperature fluctuations have an influence on the geometry of the tester. Temperature gradients, for example, within the tester can practically not be determined at all nor compensated for by theoretical calculations.

SUMMARY OF THE INVENTION

It is an object of the present invention to provide a tester for coordinate measuring devices whose geometrical dimensions are substantially independent of temperature under ordinary testing conditions.

A tester for use in testing coordinate measuring devices includes a hub having a generally tubular body portion, an outer ring, and a plurality of spokes connected to the hub and to the outer ring, each of the spokes having a generally tubular body portion and extending radially from the hub. A plurality of holders are connected to respective ones of the plurality of spokes, and elements respectively supported by the holders are provided which are adapted for use in testing the coordinates of a measuring device. The generally tubular body portion of the hub and the generally tubular body portion of each of the spokes is composed of a bonded fiber material in which layers of circumferential windings alternate with layers of helical windings, and wherein the helical windings are wound of a fiber which has a negative coefficient of thermal expansion. The holders and the elements respectively supported by the holders are composed of a relatively hard material which has a small positive coefficient of thermal expansion.

Carbon fibers or aramid (aromatic polyamide) fibers have a negative coefficient of thermal expansion relative to their longitudinal extent. Tubular layers of crisscrossing windings of such fibers therefore cause a tube formed by these fibers to be shortened when the temperature rises, while holders expand. The holders can be made out of an alloy material as sold for example under the trademarks Invar (Ni 36), NiLo 36, or NILOMAG 36, or which meets the standards specified by the German DIN No. 1.392.

By optimizing the winding angle of the fibers for the crisscrossing windings, it is possible that the expansion of the holders and the shorting of the tubes compensate each other. That is, the geometry of the spokes and the hub, and thus of the entire tester, is not changed despite temperature fluctuations which may exist in the tester.

The holding ring for the spokes may also be composed of a bonded fiber material, thus making this measuring tool light-weight and easy to manipulate.

The invention will be described in greater detail below with reference to embodiments that are illustrated in the drawings.

BRIEF DESCRIPTION OF THE DRAWINGS

FIG. 1 is a perspective view of a tester for coordinate devices according to the invention.

FIG. 2 is an enlarged view, partially in section, taken along line 2—2 in FIG. 1.

DETAILED DESCRIPTION OF THE PREFERRED EMBODIMENT

Figure 3:
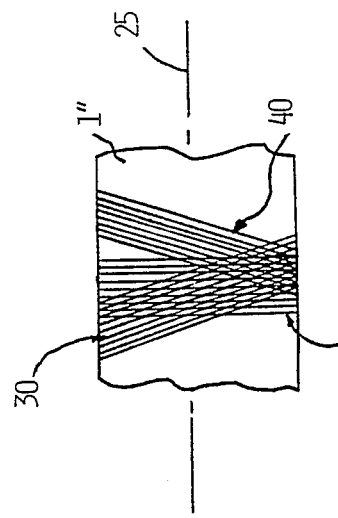
FIG. 3 is a schematic elevational view of a winding arrangement for forming a member of the tester which can be used in the present invention.

A tester 10, used in testing of coordinate measuring devices, is shown in FIG. 1 and is generally in the form of a wheel. The tester 10 has a hub 2, an outer ring 3, and spokes 1 and 1' that lie in a plane and are e.g. orthogonal to each other. The hub 2 is a generally tubular body which has a longitudinal axis that is mutually perpendicular to the longitudinal axes of the spokes 1 and 1'.

The hub 2 is connected by the spokes 1 and 1' to the outer ring 3. The spokes 1 and 1' penetrate the outer ring 3 and extend a predetermined distance beyond it. The spokes 1 and 1' are generally tubular bodies which are received within the hub 2. The hub 2, therefore, has a diameter which is larger than that of the spokes 1 or 1'. As shown in dotted outline in FIG. 1, the spokes 1 are formed by a single spoke body 12 which extends completely through the hub 2. The spokes 1' mate against the cylindrical periphery of the spoke body 12 which forms the spokes 1. The spokes 1 and 1' can be connected with the hub 2 by an adhesive Solid holders 1a which are made of Invar (Ni 36) are attached by glue to the free ends of the spokes 1 and 1' projecting from the outer ring 3. Each of the holders 1a carries a ball 1b made of glass ceramic, as sold for example under the trademark Zerodur by Jenaer Glaswerk Schott & Gen. However, substitutes such as quartz glass having similar characteristics can be employed for the holders 1a or the balls 1b.

Each of the balls 1b is secured to its respective holder 1a by a threaded steel bolt 1c which is firmly integrated in the ball 1b, and by a spring washer 1d and nuts 1e which secure the steel bolt 1c, as shown in FIG. 2. The balls 1d are respectively seated in corresponding cup-shaped recesses of each of the holders 1a. The balls 1b can be replaced by elements having other shapes, for example these elements can be in the form of cylinders. These elements can be employed depending on the particular application. A mount 2a supports a ball 2b on the hub 2. The mount 2a has a threaded body which is received in a threaded sleeve 2c. The threaded sleeve 2c is glued into the hub 2.

As shown in FIG. 3, a body 1'' (which can be formed, for example, to produce a tubular component used in forming the hub 2 or the spokes 1 and 1') is produced as follows. Fibers, such as carbon fibers, which have been saturated with synthetic resin are wound onto a mandrel (not shown) which is removed after the synthetic resin has hardened. The fibers are applied in alternating layers of circumferential windings 20 and layers of helical windings 30 and 40 which crisscross on top of one another.

If the fibers are carbon fibers, the winding angle for the fibers forming the helical windings 30 to 40 lies between 10° and 25° (as measured in either the positive or negative angular direction relative to the longitudinal axis 25 of the tube 1''), and preferably between 15° and 20°, as illustrated in FIG. 3. If aramid fibers are employed, a larger winding angle of about 30° should be employed for the helical windings 30 and 40, since aramid fibers have a greater negative coefficient of thermal expansion than the carbon fibers. Fibers having a positive coefficient of thermal expansion relative to their longitudinal extend, e.g. glass fibers, can be employed for the circumferential windings 20.

For carbon fibers, the ratio of the layer thicknesses of the helical windings 30 and 40 to the thickness of the circumferential windings lies in a range of about 2:1 to 3:1, and for aramid fibers this ratio is in a range of about 1:2.

The outer ring 3 is likewise composed of a bonded fiber material such as that used to form the spokes 1 and 1'. The outer ring 3 is connected with an adhesive to the spokes 1 and 1'. Moreover, the outer ring 3 is provided at its lower edge with three feet 3a which lie generally in a plane and are offset by 120° relative to one another. The feet 3a preferably adjustable in height in a direction which is generally perpendicular to the plane containing the feet 3a.

It will be understood that the above description of the present invention is susceptible to various modifications, changes and adaptations, and the same are intended to be comprehended within the meaning and range of equivalents of the appended claims.

What is claimed is:

1. A tester for use in testing coordinate measuring devices, comprising:

a hub having a generally tubular body portion; an outer ring;

a plurality of spokes connecting said hub to said outer ring, each of said spokes having a generally tubular body portion and extending radially from said hub and through said outer ring to produce a free end;

a plurality of holders each connected to the free end of a respective one of said plurality of spokes, and a plurality of test elements each respectively supported by one of said holders, each of said test elements being adapted for use in testing the coordinates measured by said measuring device;

said generally tubular body portion of said hub and said generally tubular body portion of each of said spokes being composed of a bonded fiber material in which layers of circumferential windings alternate with layers of helical windings; said helical winding being formed from a fiber which has a negative coefficient of thermal expansion; and each of said holders and said elements being composed of a relatively hard material which has a small positive coefficient of thermal expansion.

2. A tester as defined in claim 1, wherein said outer ring is composed of said bonded fiber material.

3. A tester as defined in claim 1, wherein each of said spokes are connected with said hub and with said outer ring by an adhesive.

4. A tester as defined in claim 1, wherein an additional holder and additional test element are connected to one end of said hub.

5. A tester as defined in claim 1, wherein each of said elements are ball-shaped.

6. A tester as defined in claim 1, wherein each of said holders and said elements are composed of quartz glass.

7. A tester as defined in claim 1, wherein each of said holders and said elements are composed of ceramic material.

8. A tester as defined in claim 1, wherein said layers of helical windings include at least one helical winding oriented in a first angular direction relative to the longitudinal axis of the tubular body portion, and an adjacent, overlying helical winding layer is oriented in a second angular direction relative to the longitudinal axis of the tubular body portion.

9. A tester as defined in claim 8, wherein said fiber forming said layers of helical windings is a carbon fiber, and said angular directions are in a range of 10 degrees to 25 degrees.

10. A tester as defined in claim 8, wherein said fiber forming said layers of helical windings is a carbon fiber, and said angular directions are in a range of 15 degrees to 20 degrees.

11. A tester as defined in claim 8, wherein said fiber forming said layers of helical windings is an aramid fiber, and said angular directions are approximately 30 degrees.

* * * * *